(12) United States Patent
Schneeberger (10) Patent No.: US 11,441,593 B2
(45) Date of Patent: Sep. 13, 2022

(54) INTERCHANGEABLE, DEBRIS INSENSITIVE AND NON-SLIPPING REACTION TORQUE TRANSFER SYSTEM

(71) Applicant: Johannes P. Schneeberger, Brisbane, CA (US)

(72) Inventor: Johannes P. Schneeberger, Brisbane, CA (US)

( * ) Notice: Subject to any disclaimer, the term of this patent is extended or adjusted under 35 U.S.C. 154(b) by 390 days.

(21) Appl. No.: 16/695,159

(22) Filed: Nov. 25, 2019

(65) Prior Publication Data
US 2020/0166071 A1     May 28, 2020

Related U.S. Application Data

(62) Division of application No. PCT/US2018/034746, filed on May 25, 2018.

(51) Int. Cl.
| | |
|---|---|
| *F16B 39/24* | (2006.01) |
| *B25B 23/00* | (2006.01) |
| *B25B 23/10* | (2006.01) |
| *B25B 23/142* | (2006.01) |
| *B25B 21/00* | (2006.01) |

(52) U.S. Cl.
CPC .......... *F16B 39/24* (2013.01); *B25B 23/0035* (2013.01); *B25B 23/0078* (2013.01); *B25B 23/0085* (2013.01); *B25B 23/108* (2013.01); *B25B 23/142* (2013.01); *B25B 23/1422* (2013.01); *B25B 21/00* (2013.01)

(58) Field of Classification Search
CPC ............. B25B 23/0078; B25B 23/142; B25B 23/1422; B25B 23/0035; F16B 39/24

USPC .......................................................... 81/475
See application file for complete search history.

(56) References Cited

U.S. PATENT DOCUMENTS

| | | | | |
|---|---|---|---|---|
| 1,911,384 | A * | 5/1933 | Olson ..................... | F16B 39/24 411/164 |
| 4,090,421 | A * | 5/1978 | Czeczerski ........... | B25B 13/483 81/475 |
| 5,571,014 | A * | 11/1996 | Gregory, Jr. ......... | A61C 8/0089 433/141 |
| 5,626,449 | A * | 5/1997 | McKinlay ............. | F16B 39/282 411/533 |
| 6,039,524 | A * | 3/2000 | McKinlay ............. | F16B 39/282 411/533 |

(Continued)

*Primary Examiner* — David B. Thomas
*Assistant Examiner* — Jonathan G Santiago Martinez (57) ABSTRACT

Interchangeable reaction washer initially penetrates with outward bottom serration edges only during manual pre tightening. Slippage is thereby avoided at begin of the consecutive power torque wrench assisted full tightening of the nut and/or bolt head resting on it. As the load ramps up, the reaction washer flattens out and the bottom serrations gradually penetrate radially inwards. Reaction and actuation sockets of varying sizes matching a broad range of reaction washers and nut and/or bolt heads may be interchangeably snapped on a reaction coupling connected to the torque wrench housing. A clearance undercut underneath the reaction washer torque receiving flanges absorbs eventual debris to further assist unimpeded and fast coupling of the system. Radially oriented contact faces between reaction washer and reaction socket provide a snug contact unaffected by their toroidal movement during washer flattening and a force transfer free of radial force components.

10 Claims, 6 Drawing Sheets

(56) References Cited

U.S. PATENT DOCUMENTS

| | | | | |
|---|---|---|---|---|
| 7,128,511 | B2* | 10/2006 | Hewgill | F16B 39/24 |
| | | | | 411/533 |
| 7,246,542 | B2* | 7/2007 | Karol | B25B 29/02 |
| | | | | 81/125 |
| 9,555,526 | B1* | 1/2017 | Gauthier | B25B 23/141 |
| 10,107,325 | B2* | 10/2018 | Davis | F16B 23/0061 |
| 10,219,854 | B2* | 3/2019 | Nino | B25B 23/1427 |
| 2002/0146299 | A1* | 10/2002 | Hewgill | F16B 21/183 |
| | | | | 411/145 |
| 2003/0007844 | A1* | 1/2003 | Terry | F16B 39/286 |
| | | | | 411/186 |
| 2013/0327190 | A1* | 12/2013 | Laurenti | B25B 23/1427 |
| | | | | 81/475 |
| 2014/0348613 | A1* | 11/2014 | Davis | F16B 31/043 |
| | | | | 411/330 |
| 2014/0377032 | A1* | 12/2014 | Delcher | F16B 39/24 |
| | | | | 411/149 |
| 2016/0375563 | A1* | 12/2016 | Junkers | B25F 5/026 |
| | | | | 81/467 |
| 2018/0339377 | A1* | 11/2018 | Schneeberger | B25B 23/108 |
| 2019/0003512 | A1* | 1/2019 | Junkers | B25B 21/00 |
| 2019/0003513 | A1* | 1/2019 | Junkers | F16B 43/00 |
| 2019/0120275 | A1* | 4/2019 | Junkers | B25B 21/00 |
| 2020/0386263 | A1* | 12/2020 | Davis | B25B 21/002 |

* cited by examiner

INTERCHANGEABLE, DEBRIS INSENSITIVE AND NON-SLIPPING REACTION TORQUE TRANSFER SYSTEM

PRIORITY CLAIM

The present Application claims priority to and from PCT patent application U. S. Ser. No. 18/34,746 of the same Title, filed 25 May 2018, which in turn claims priority to and from U.S. patent application titled "Concentric Actuation and Reaction Torque Transfer System", application Ser. No. 15/605,861 and U.S. patent application titled: "Reaction Washer with Belleville Spring induced radially inward progressing Bottom Bite Action and Tightening and Securing System", application Ser. No. 15/605,876, both filed on 25 May 2017.

FIELD OF INVENTION

The present invention relates to interchangeable systems and tools for transferring an actuation torque on an actuation receiving structure such as a nut and/or bolt head with varying size and/or shape while concentrically transferring a corresponding oppositely acting reaction torque onto an underneath base surface via an in between belleville reaction washer with interchangeable configuration and functionality.

BACKGROUND OF INVENTION

Reaction washers are increasingly employed to transfer onto a base surface underneath a reaction torque that is resulting from actuating a nut or bolt head resting on the reaction washer. Reaction washers are conveniently placed in between the nut and/or bolt head to be tightened on the flange surface. They bite into the underneath flange surface while the nut and/or bolt head is tightened by the applied actuation torque. The resulting reaction torque is thereby concentrically and without any distorting side loads transferred from the torque wrench housing onto the flange body.

In the prior art, actuation and reaction sockets are combined and fixed on the power torque wrench commonly via a number of small screws. At the time this invention was made, commercially available reaction washers provide only reaction torque transfer without any well known washer functionality to secure nuts and/or bolt heads against unintentional loosening. Even worse and because the necessary tight fit of reaction torque transfer tools, the employment of additional safety washers is prohibitive together with prior art reaction washers and their respective tightening systems. Therefore, there exists a need for an interchangeable nut and/or bolt head actuation system that includes interchangeable and variably configured reaction washers including configurations with varying levels of securing against inadvertent loosening. The present invention addresses this need.

Also in the prior art and at the time this invention was made, commercially available reaction washers are only available in a fixed ratio between center hole and outside diameters, which limits the combination of varying nut and/or bolt head sizes and styles for given bolt thread diameters. The respective prior art actuation and reaction torque transfer tools provide limited interchangeability between reaction washer outside size and nut and/or bolt head size and style. Therefore, there exists a need for an interchangeable actuation and reaction torque transfer tool system that can be fast, easily and reliably adapted for varying reaction washer outside sizes and nut and/or bolt head sizes and styles. The present invention addresses also this need.

It is imperative for proper function of a reaction washer that it does not slip during the tightening phase during which the axial load and the reaction torque on the reaction washer ramp up from an initial minimum to the final tightening load of the nut and/or bolt head resting on the reaction washer. To meet this requirement, the slippage resistance in between the reaction washer bottom and the base surface has to be at any time higher than the friction in the respective actuated thread interface. To accomplish this in a flat surface contact with a base surface, the mean diameter of initial bottom serration contact with the base surface is desirably substantially more than 13.3% larger than the mean thread diameter. This is because common threads have about 60 deg thread flank angle resulting in a normal force on the thread flanks and the corresponding friction force to be at least 13.3% higher than in between a flat surface pair of similar configuration. Nevertheless, inadvertent contamination and/or corrosion in the thread interface and presence of lubricant, paint or other friction reducing elements on the base surface may occur in field conditions such that keeping an initial bottom serration contact radius to a maximum alone may not suffice. In a prior art, circumferentially arrayed bite spikes were introduced to provide initial bite into a base surface such that reaction torque transfer does not rely on surface friction alone but also on a form interlock between the spike tips and their respective indentations on the base surface. Although this proves highly effective, there exists still a need for an initial bottom serration contact area that is at a minimum while at a maximum distance from the reaction washer axis and while at the same time providing a gradual, radially inward progressing contact between the reaction washer bottom and the base surface during the respective tightening operation. The present invention addresses this need.

Reaction washers feature torque receiving structures placed at the washer circumference. To transfer the reaction torque from a reaction socket onto them, the reaction socket commonly features a drain interface on its bottom that couples in a torque transferring fashion with the torque receiving structures. To keep the coupling between reaction washer and reaction socket compact and within eventually very limited space available around the nut or bolt head to be tightened, it is desirable to have the drain interface and torque receive structures to snuggly fit. On the other hand and in case of a belleville reaction washer being employed, the flattening of the belleville washer during its axial loading may cause angular displacement around its periphery, which may adversely affect a snug fit between torque receiving structures and drain interface. In addition and in the eventual presence of debris and/or paint on or around the reaction washer's torque receiving structures, a snug fit of them with the drain interface may be impaired by such debris and/or paint. Therefore, there exists a need for a reaction washer and tightening system including drain interface and torque receiving structures that are configured to provide a snug fit that on one hand is insensitive to the displacement occurring during flattening of a belleville reaction washer and that on the other hand provides clearance spacing to accommodate for debris and/or paint that is being pushed out of in between the torque receiving structures during their coupling with the drain interface. The present invention addresses also this need.

SUMMARY

An actuation and reaction socket tool system features a reaction coupling that is slid onto and eventually attached to a well known spline flange of a power torque wrench followed by a coupling of it with the drive shaft of the torque wrench. An actuation socket of the system is mating the size and shape of a nut and/or bolt head to be tightened or loosened. Depending on the outside size of a reaction washer underneath that nut and/or bolt head, a reaction coupling of corresponding size is then selected and snapped onto the reaction socket via circumferentially arrayed and interlocking castles on both the reaction coupling and reaction socket. One or more lock plates spring loaded snap into grooves on the inside of the castles and axially locks the reaction coupling with the reaction socket. At least one of the reaction coupling and reaction socket may be axially withheld by the central actuation socket via an optional well known safety pin that has eventually previously been inserted into the actuation socket and the drive shaft during their coupling. That way, the entire reaction socket tool system may remain connected to the power torque wrench while the safety pin remains in place. To remove the tool from the power torque wrench, the reaction coupling and reaction socket may be first decoupled, which provides access again to the safety pin for its removal. Alternately and instead of employing the safety pin, the reaction coupling may be fixed onto the spline flange and the power torque wrench directly. In that case, the reaction and actuation sockets may be quick and easily replaced by merely actuation the lock plate(s).

Further part of the interchangeable nut and/or bolt head actuation system may be interchangeable reaction washers with belleville spring body. The belleville spring washer configuration includes radial serrations on its slightly conical bottom face and optionally on its top face as well. A narrow central serration free rim on washer top and bottom may prevent stress spikes in the serration grooves along the central washer hole during flattening of the reaction washer at full load.

During initial loading, a minimum serration contact ring on the reaction washer bottom is in a maximum distance to the washer axis and may be offset from an inner receive flange diameter by a clearance radius within which a clearance undercut may provide room to clear out eventual debris from in between the torque receive structures of the reaction washer's torque receive flange during coupling with the reaction socket. Inadvertent eventual increased friction in the thread interface as well as eventual friction reducing elements on the base surface such as paint, dust or lubricant are thereby counter acted and slippage between the reaction washer and the base surface is prevented.

The small initial serration contact area of only the peripheral ends of the bottom serrations causes a biting of them at an earliest moment of load increase during initial tightening thereby transitioning earliest on from a pure friction based contact to a biting form contact. As the tightening load increases, the reaction washer continues to flatten out and the bottom serrations extend their bite into the base surface towards the washer axis and within the radial extension of the nut or bolt head contact area with the washer top. At a maximum tightening load, the reaction washer is substantially flattened out and eventual top serrations of the reaction washer bite into the nut and/or bolt head and assist together with the springy resistance of the belleville shaped reaction washer in withholding it against becoming inadvertently loose.

A number of torque receiving structures are radially outward protruding arrayed along an outer circumference of the reaction washer and with their top substantially flush with the circumference of the conical serration top face. Their bottom is vertically offset from the conical serration bottom face to provide sufficient clearance to a base surface into which the reaction washer may be biting into while transferring a tightening load from an above nut or bolt head. During flattening of the reaction washer, the reaction washer experiences toroidal deformation causing the torque receiving structures to tilt upwards of about the same angle about which a radial washer cross section flattens. Torque receiving faces of the torque receiving structures are substantially radially oriented such that the angular deflection of the torque receive structures leaves their orientation substantially unaffected. Consequently, the contact with a drain interface of a reaction socket remains snug during deformation of the reaction socket between relaxed and flattened state and free of peak surface stresses.

As another favorable result of the substantially radially oriented torque receive faces, the reaction torque transfer from the torque transfer flanks of the drain interface onto the torque receiving faces is substantially free of radially acting forces, which in turn eliminates the need for a circumferentially continuous support around the drain interface. The torque inducing structures that provide the torque transfer flanks are consequently tapering downwards on their outside resulting in a wedge shape of them. This further reduces radial access space necessary to transfer the reaction torque onto the reaction washer and clears out eventual debris or paint that may cover the gaps between torque receiving structures. The radially outward open gaps between the torque inducing structures provide for a mostly outward ejection of the debris while the reaction socket is pushed down over the reaction torque receiving interface of the reaction washer. Eventually remaining debris may be radially inward displaced into the clearance undercut.

DETAILED DESCRIPTION

Referring to FIGS. 1-9, a reaction washer 10 has a washer axis 10A, a conical top face 13, a conical bottom face 17 and a reaction torque receiving interface 23. The washer axis 10A may coincide with a reaction torque axis 100A around which a reaction torque RT may be transferred onto the reaction torque receiving interface 23 via a drain interface 132 of a reaction socket 130. The reaction torque RT may result from applying an oppositely acting actuation torque TL/TT as a tightening torque TT or a loosening torque TL on an actuation receiving structure 1 such as a nut or bolt head 1. An actuation torque TT/TL may be applied by a well know torque wrench 90 via a well known actuation socket 120 coupled to the actuation receiving structure 1.

Due to the thread pitch of the tightening thread 2, the tightening torque TT may result during tightening in a rotation of the actuation receiving structure 1 and a sliding of the tightening thread 2 in a downward direction and increase from an initial load LI towards final tightening load LF onto base surface 7. During loosening, the loosening torque TL may result of a sliding of the tightening thread 2 in loosening direction and the final tightening load LF being reduced again.

Loads LI and LF in between initial and final state are transferred via a load inducing face 3 at the bottom of the actuation receiving structure 2 onto a conical top face 13 of a reaction washer 10. Top serrations 16 may be circumferentially arrayed on the conical top face 13 and a central serration free top rim 15 may be employed concentrically inside the conical top face 13. In this case and due to a top belleville angle 13A, the central serration free top rim 15 may be slightly higher than the top serrations 16 such that during load transfer of a minimal load LI, the preferably planar load inducing face 3 may be resting on and sliding around the central serration free top rim 15 in an initial low resistance sliding contact.

During torque wrench tightening with actuation socket and reaction socket 130, rotational resistance between the actuation receiving structure 1 and the reaction washer 10 is of no substantial functional concern. During initial manual assembly and preloading up to the initial load LI to the contrary, rotational resistance between the actuation receiving structure 1 and the reaction washer 10 may be of concern. Sliding of the bottom serrations 17 along the base surface 7 may cause material removal from the base surface 7 that may clog the bottom serrations 17 and impair their biting during the following torque wrench assisted tightening. Hence, the initial low resistance sliding contact may be favorably utilized during manual assembly of reaction washer 10 and actuation receiving structure 1 and eventual manual establishment of the initial load LI without need to manually hold the reaction washer 10 against inadvertent rotation and inadvertent clogging of the bottom serrations 17.

Once the actuation receiving structure 1, the reaction washer 10 are assembled with washer hole 11 being concentrically with respect to washer axis 10A and torque transfer axis 100A aligned with the base hole 8 and the tightening thread 2, the conical top face 13 or central serration free top rim 15 may be loaded by the load inducing face 3. A reaction socket 130 may be coupled via its drain interface 132 with a reaction torque receiving interface 23 of the reaction washer 10 and an actuation socket 120 coupled with the actuation receiving structure 1.

The conical top face 13 may have a number of top serrations 16 that are circumferentially arrayed around the washer axis 10A. The conical bottom face 17 features a number of bottom serrations 20 that are also circumferentially arrayed around the washer axis 10A and that are radially inward extending from a bottom conical face circumference 18. The reaction torque receiving interface 23 has a number of torque receive structures 25 that are radially outward protruding and circumferentially arrayed around the washer axis 10A along an outer circumference of the reaction washer 10.

The reaction washer 10 may have preferably a cross section thickness 10H that is substantially continuous in radial direction at least in between the conical top face 13 and conical bottom face 17. A top belleville angle 13A of the top conical face 13 and a bottom belleville angle 17A of the bottom conical face 17 are generally in between 0.1 and 8 degrees such that upon an initial load LI received via load inducing face 3 on at least one of the conical top face 13 and a top central serration free rim 15, substantially only an initial peripheral serration contact rim 21 of the bottom serrations 20 penetrates into a base surface 7. Preferably, the belleville angles 13A, 17A are in between 2 and 5 deg. The base surface 6 is part of a base 5 and is underneath the reaction washer 10 and opposing the initial load LI. Upon increasing the initial load LI up to a final tightening load LF, the conical bottom face 17 is flattening out and the bottom serrations 20 are radially inward penetrating the base surface 6 up to a full load serration contact area 22.

The torque receive structures 25 may be part of a reaction torque receiving flange 35 positioned along a peripheral circumference of the reaction washer 10 and may be extending radially outward the initial peripheral serration contact rim 21 by clearance radius 36R. The reaction torque receiving flange 35 may have a flange top 39 and a flange bottom 40 with receive flange height 35H and receive flange diameter 35D. The flange top 39 may be substantially level with and adjacent to a first conical top face circumference 14. The flange bottom 40 is recessed from and adjacent to a second conical bottom face circumference 18 by clearance height 36H. Clearance radius 36R and clearance height 36H define a clearance undercut underneath the reaction torque receiving flange 35 that may serve to contain debris and/or displaced paint so that neither debris nor displace paint may impede the coupling of and snug fit between the reaction torque inducing structures 135 and the torque receiving structures 25. The torque receive structures 25 may be extending in between the flange top 39 and flange bottom 40. The torque receive structures 25 have torque receive faces 29 that are substantially radially inward oriented and aligned with the washer axis 10A such that a reaction torque RT around the washer axis 10A received by the torque receive faces 29 results in a contact force FC that is under consideration of well known contact friction substantially free of any radial force component.

Part of a reaction torque drain system 100 and while the torque receiving interface 23 is coupled to a drain interface 132 of a reaction socket 130, the torque receive faces 29 are oppositely substantially mating a number of torque transfer flanks 137 provided by reaction torque inducing structures 135 that are circumferentially arrayed around a bottom flange 149 of a reaction socket 130. Since the contact force FC is substantially in circumferential direction and free of any radial force component in consideration of well known contact friction, the reaction torque inducing structures 135 of the drain interface 132 may extend individually downward from the bottom flange 149 without need of any circumferentially continuous support structure. Moreover, the reaction torque inducing structures 135 may have outer faces 139 that are conically downward and radially inward tapered in direction away from the reaction socket 130. As a favorable result, the drain interface 132 may be fitted with tight spaces around the reaction washer 10. As another favorable result, the drain interface 132 may easily penetrate with the downward wedge shaped reaction torque inducing structures 135 into eventual thick debris layers around the torque receiving interface 23 and in between the torque receive structures 25 and may be radially self cleaning as debris may radially outward eject from in between the reaction torque inducing structures 135 and/or radially inward towards the clearance undercut 36. Such debris may be present particularly when having to access a reaction torque receiving interface 23 that has been painted over or otherwise exposed to environmentally induced debris deposits.

The torque receive structures 25 are preferably offset from the conical bottom face 25 such that a hooking nose 141 extending from a distal end of the torque transfer flanks 137 is hooking in underneath the respective torque receive structures 25 immediately above and clear off the base surface 7 while the drain interface 132 is coupled and reaction torque RT transferring to the reaction torque receiving interface 23. The hooking noses 141 may be extending from both transfer flanks 137 of the reaction torque inducing structures 135 so that they may hook underneath the torque receive structures 25 during application of a tightening torque TT or a loosening torque TL on the actuation receiving structure 1.

The reaction washer 10 may further feature on its washer top 12 a central serration free top rim 15 and on its washer bottom 24 a central serration free bottom rim 19. Central serration free top and bottom rims 15, 19 may provide for continuous stress levels that may be at a maximum around the washer hole 11 while the reaction washer 10 is flattened out and may eliminate peak stress areas in the grooves between the serrations 16, 20 along the most stress sensitive areas around the washer holes 11, 56, 76.

Reaction washer 10 may be made of well known materials such as hardened steel suitable of providing sufficient hardness for the serrations 16, 20 to bite into common materials of actuation receiving structures 1 and bases 6 while at the same time providing sufficient resilience for the belleville spring action of them. A reaction washer 10 may be positioned with its hole 11 over a base hole 8 on a base surface 7. Then the actuation receiving structure 1 such as a nut or bolt may be manually screwed on until the load inducing face 3 is in snug contact with either the conical top face 13 or the central serration free top rim 15 and an initial load LI is established. The reaction washer 10 or washer stack 50 do not slide with their bottom serrations 20 initial peripheral serration contact rim 21 in particular on the base surface 7 but penetrate already sufficiently into it during initial loading LI. As the reaction washer 10 or reaction washer stack 50 remains substantially in its natural shape thereby without any flattening and the bottom serrations 20 in the bottom belleville angle 17A to the base surface 7, only their very outward end may contact and penetrate into the base surface 7 in a sharp point contact. All the sharp point contacts may circumferentially combine to the initial peripheral serration contact ring 21 that is in a maximum concentric distance around the washer axis 10 and has minimal contact area. Both of these criteria substantially contribute to a successful bite action of the bottom serrations 20 at initial load LI even across lubricant, or paint layers that may be present on the base surface 7.

In a following step, a well known torque wrench 90 is coupled to the actuation receiving structure 1 via an actuation socket 120 to induce rotation and is coupled with its housing 92 to the reaction torque receiving interface 23 via the reaction socket 130 to transfer and drain reaction torque RT as is taught in more detail below. While a tightening torque TT is applied to the actuation receiving structure 1 and it being screwed downward along the tightening thread 2, the bottom serrations 20 free of debris bite unimpeded into the base surface 7 and drain the corresponding reaction torque RT received via the reaction torque receiving interface 23 into the base 6. As the initial load LI ramps up to the final tightening load LF, the reaction washer 10 flattens out and the bottom serrations 20 gradually bite radially inward towards the washer axis 10A and directly underneath the load inducing face 3 for a straight axial transfer of the full tightening load LF onto the bottom serrations 20. This results in maximum bite action and rotational resistance of the reaction washer 10. Any eventual lubricant or paint layers may be thereby also gradually squeezed into the base hole 8 and/or clearance undercut 36 thereby maximizing bite of the bottom serrations 20 even in the eventual presence of lubricant or paint on the base surface 7.

The flattening of the reaction washer 10 introduces an angular upward displacement of the torque receive structures 25. Due to the preferably substantially radial alignment of the torque receive faces 29, the snug contact with torque transfer flanks 137 is maintained and thus surface peak stresses and destructive deformation and galling prevented during washer flattening. Top and bottom belleville angles 13A and 17A are preferably equal such that full load serration contact area 22 is provided while at the same time snug contact in the conical multi ramp interface 58 is maintained up to full load LF.

At full predetermined load LF, the eventual top serrations 16 bite into the load inducing face 3 such that the actuation receiving structure 1 is withheld by the reaction washer 10 against inadvertent rotation in loosening direction. At the same time, the belleville resilient load carrying of the reaction washer 10, the actuation receiving structure 1 is prevented from axially disengaging from the top serrations 16 in case of axial load vibrations or fluctuations as are well known in the art.

To loosen the actuation receiving structure 1 again, the drain interface 132 may be reengaged with reaction torque receiving interface 23. Any debris accumulated around the reaction torque receiving interface 23 or in between the torque receive structures 25 is displaced by the wedge shaped reaction torque inducing structures 135 and radially outward ejected via the radially outward open gaps between them and/or radially inward pushed into the clearance recess 36. Once reaction socket 130 and actuation socket 120 are coupled, a loosening torque TL is applied to a level such that the friction in the tightening thread 2 and between the load inducing face 3 and the conical top face 13 with its eventual biting top serrations 13 is overcome.

Figure 1:
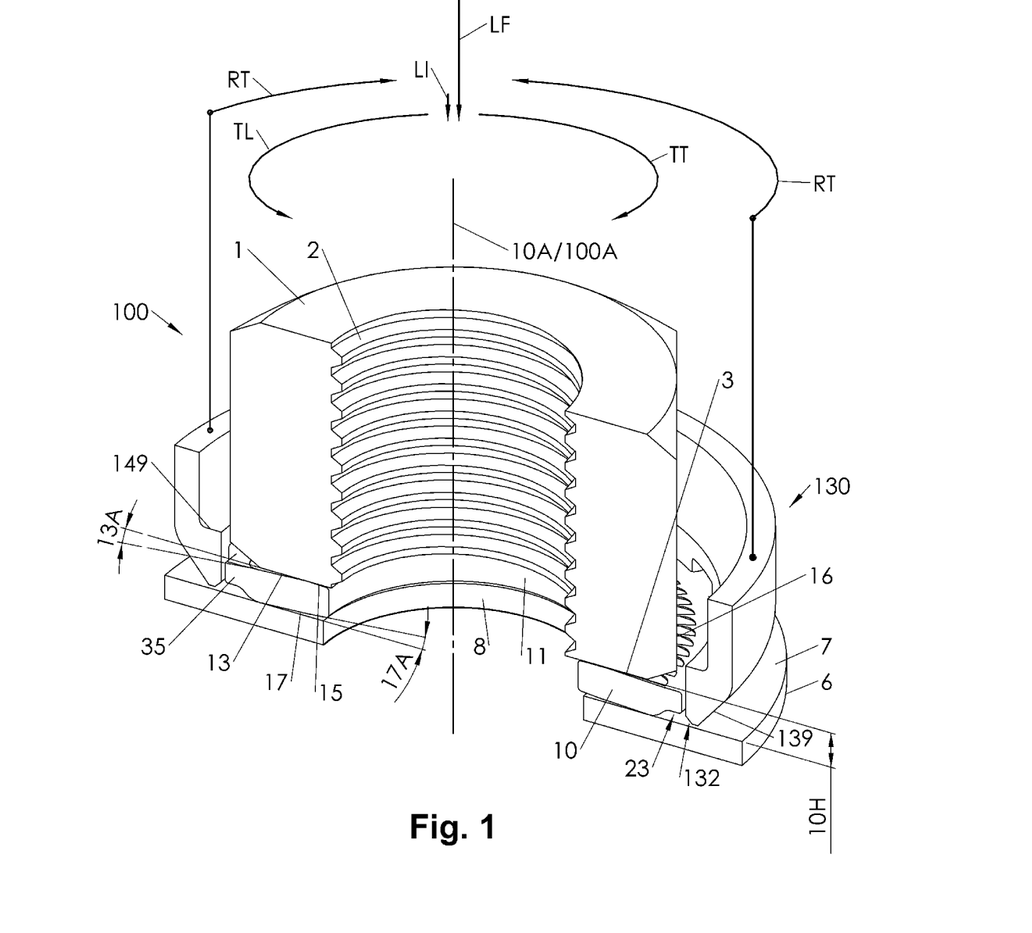
FIG. 1 is a first perspective cut down view of a first embodiment reaction washer that is supporting a nut above and that is resting on a base. Also shown is a bottom portion of a reaction socket circumferentially engaging with the reaction washer.
Figure 2:
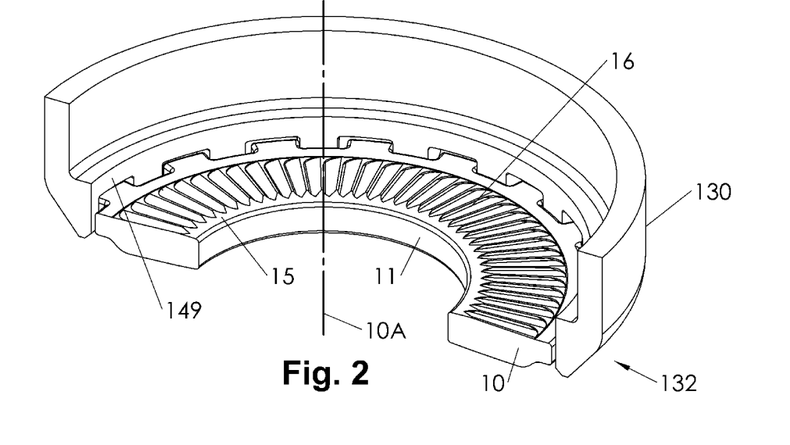
FIG. 2 is the first perspective cut down view of the reaction washer and reaction socket of FIG. 1.
Figure 3:
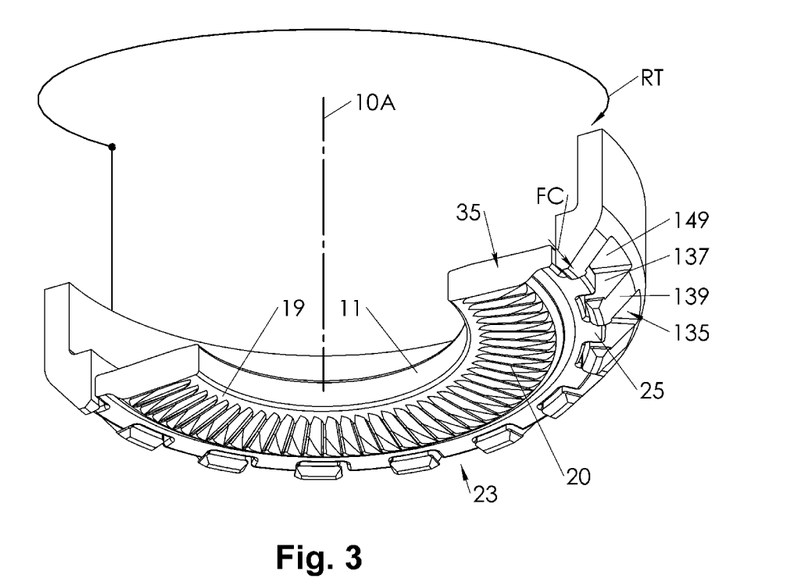
FIG. 3 is a second perspective cut up view of the reaction washer and reaction socket of FIG. 1.
Figure 4:
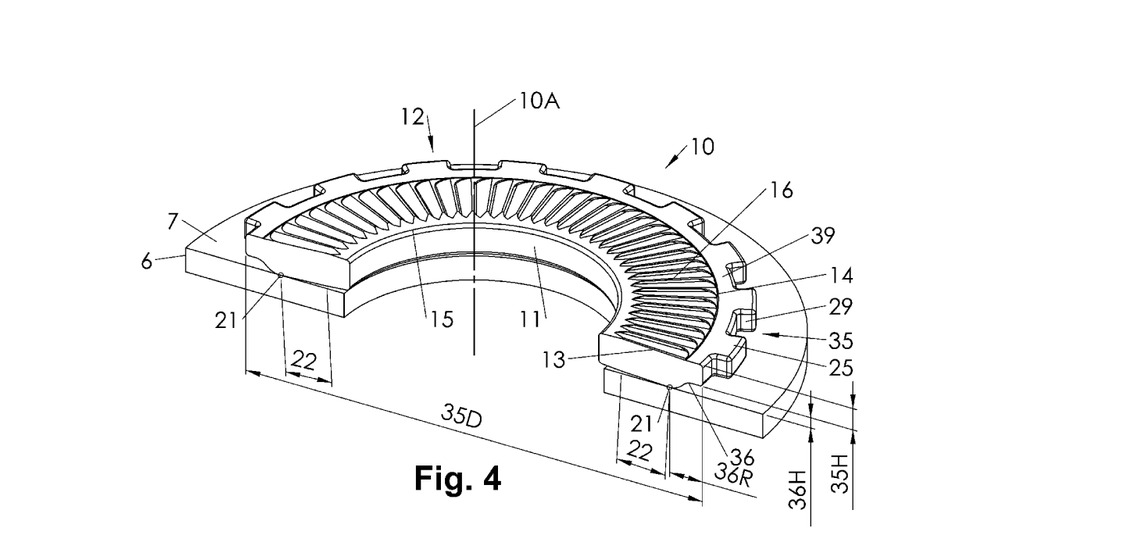
FIG. 4 is the first perspective cut down view of the reaction washer and base of FIG. 1.
Figure 5:
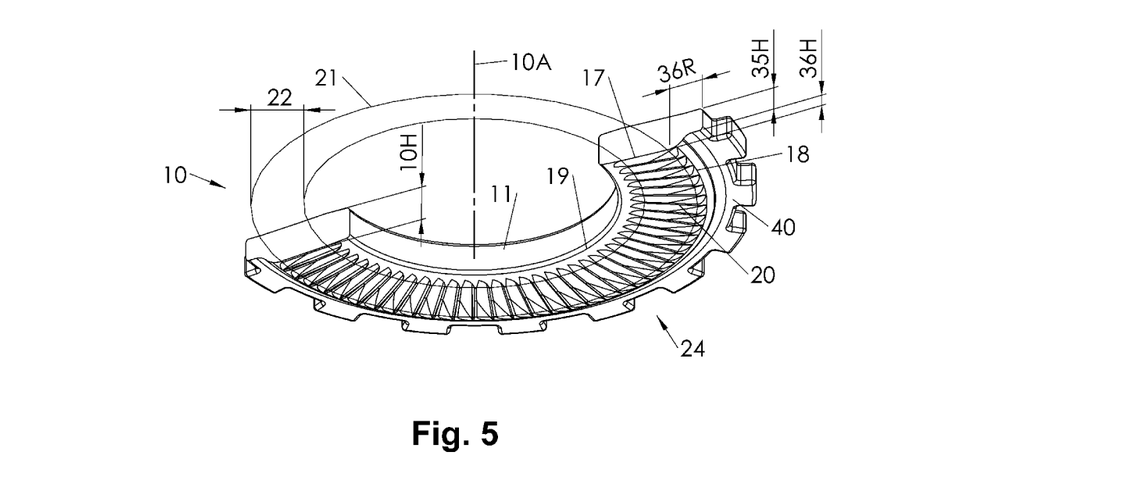
FIG. 5 is the second perspective cut up view of the reaction washer of FIG. 1.
Figure 6:
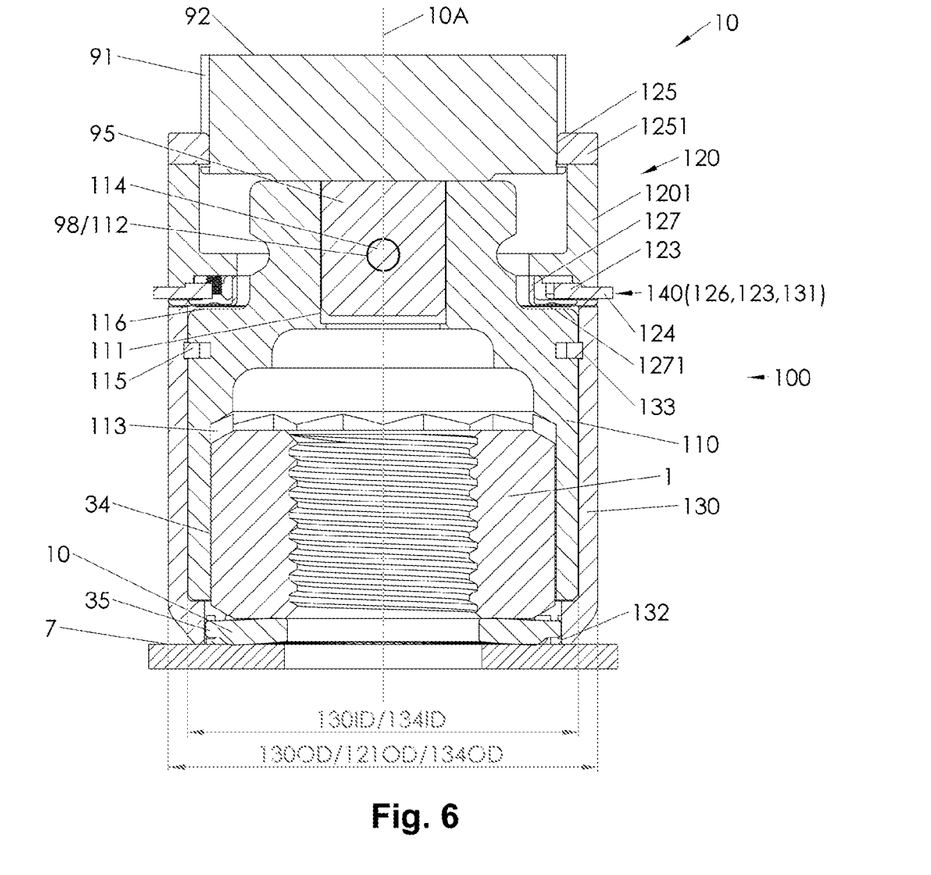
FIG. 6 is a frontal cut view of the preferred embodiment of the interchangeable actuation and reaction tool system in operational position.

As in FIG. 6, a torque transfer system 100 for concentrically and simultaneously transferring an actuation torque and a reaction torque around a torque transfer axis 10A features an actuation socket 110, a reaction coupling 120 and a reaction socket 130. The actuation socket 110 may have a drive shaft torque interface 111, an axial shaft lock interface 112, an actuation interface 113 and an axial retention structure in the form of snap ring 115 and/or a circumferential retention face 116.

In operational position, the actuation socket 110 is coupled with a drive shaft 95 of a torque wrench 90 via its drive shaft torque interface 111 that is correspondingly shaped and in a torque transferring mate with the contoured shape such as for example a square of the drive shaft 95 as is well known in the art. The actuation interface 113 such as for example but not limited to a hex, double hex, Torax™, triple square, is thereby positioned substantially centrally and concentrically with respect to the torque transfer axis 10A and is facing away from the torque wrench 90 for transferring the actuation torque from the drive shaft 95 onto the actuation receiving structure 1 such as a nut and/or bolt head.

The actuation socket 110 may be axially coupled to the drive shaft 95 via an axial shaft lock interface in the preferred configuration of a lock pin 114 engaging with a radial through hole 112 that is radially extending through the body of the actuation socket 110 and a radial shaft hole 18 that is radially extending through the drive shaft 95. The axial retention feature 115/116 is thereby axially positioned with respect to the torque wrench 90.

The reaction coupling 120 has a torque wrench interface 125 and a reaction socket interface 126. The torque wrench interface 125 may be in the preferred form of an internal spline 125 in a configuration that is mating preferably a spline flange 91 that may be part of a well known housing 92 of the torque wrench 90. The spline flange 91 may be positioned axially adjacent the drive shaft 95 and may be substantially concentric with respect to the torque transfer axis 10A. The torque wrench interface 125 is torque transferring and may be axially slide able or axially fixed coupled with the housing 92 in general but preferably with the spline flange 91. The reaction socket interface 126 becomes thereby positioned substantially concentric with respect to the torque transfer axis 10A and is facing away from the torque wrench 90.

The reaction socket 130 has a coupling interface 131 and a drain interface 132. While the reaction socket 130 is rotationally move able with respect to and substantially concentric surrounding the actuation socket 110, it is coupled with the reaction socket interface 126 via its coupling interface 131. Thereby, the drain interface 132 is substantially concentrically surrounding and axially adjacent the actuation interface 113. Consequently, the reaction torque is transferred from the housing 92 onto a reaction receiving structure 10 that may be positioned at least beneath but preferably also concentrically with respect to the torque transfer axis 10A around the actuation receiving structure 1. The reaction receiving structure 10 may be preferably a reaction washer 10, which in turn may transfer the received reaction torque onto a base surface 7.

In case of the axial retention structure 115 being the snap ring 115, the reaction socket 130 may have an internal circumferential snap groove 133 in which a snap structure such as a snap ring 115 may snap in. Thereby, the reaction socket 130 may be axially secured with respect to the torque transfer axis 10A and onto the actuation socket 110. Snap structure access holes 1331 may radially extend through the body of the reaction socket 130 and may be circumferentially arrayed around the snap groove 133 to externally access and radially depress the snap ring 115. That way, the reaction socket 130 may be removed again from the actuation socket 110. The snap ring access holes 1331 may be threaded such that the radial inward displacement of the snap ring 115 may be accomplished by screwing in set screws or the like into the snap structure access holes 1331.

The axial retention feature 116 may alternately be a circumferential retention face 116 that may be facing towards the torque wrench 90. In that case, the reaction coupling 120 may have an axial stop face 1271. The axial stop face 1271 may be resting against the circumferential retention face 116 while the actuation socket 110 is axially secured on the drive shaft 95 and the reaction coupling 120 is coupled via its torque wrench interface 125 with the spline flange 91 of the housing 92.

The axial retention feature 114 may alternatively be provided by the radial lock pin 114 that may radially extend outside the radial pin hole 112 and underneath the axial stop face 1271 while assembled to axially secure the actuation socket 110 on the drive shaft 95. In that case and as may be clear to anyone skilled in the art, the reaction coupling 120 may be axially secured on the housing 92 by the axial stop face 1271 resting against the lock pin 114.

Figure 7:
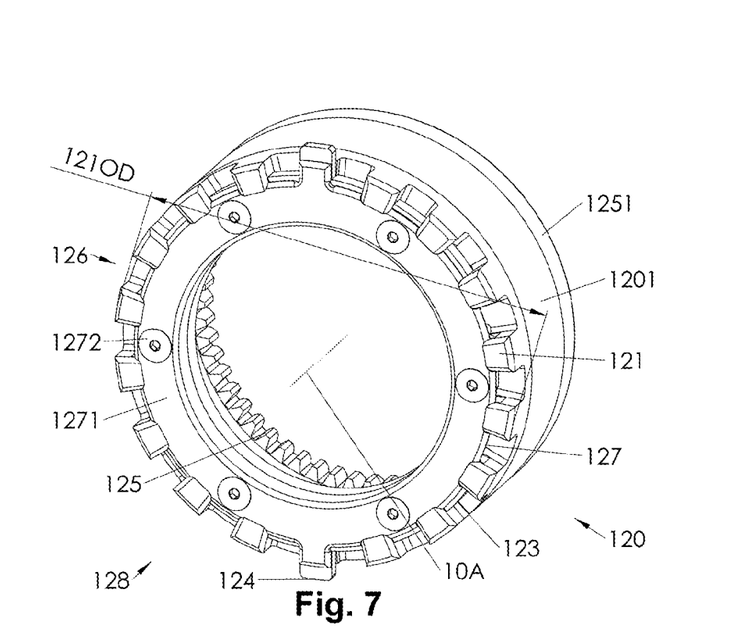
FIG. 7 is a fifth perspective view of a reaction coupling of FIG. 6.
Figure 8:
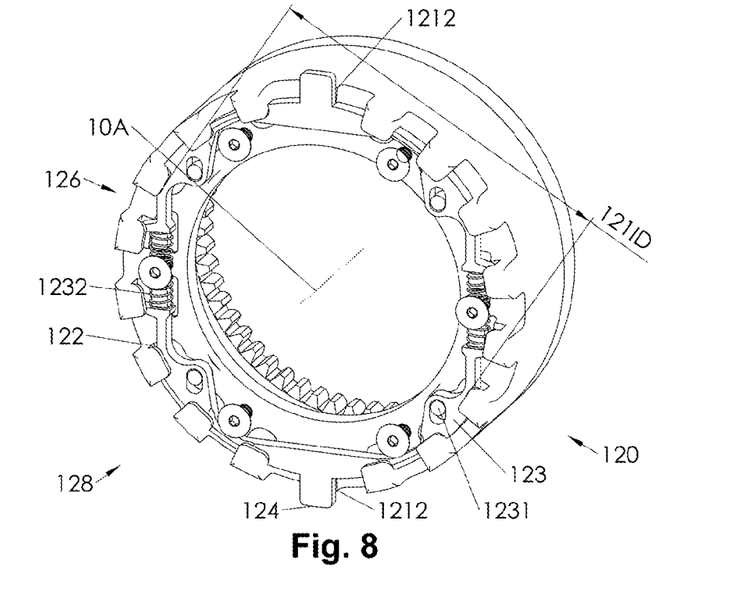
FIG. 8 is the fifth perspective view of the reaction coupling of FIG. 7 with a snap lock cover removed. Tangent edges are not shown for clarity.
Figure 9:
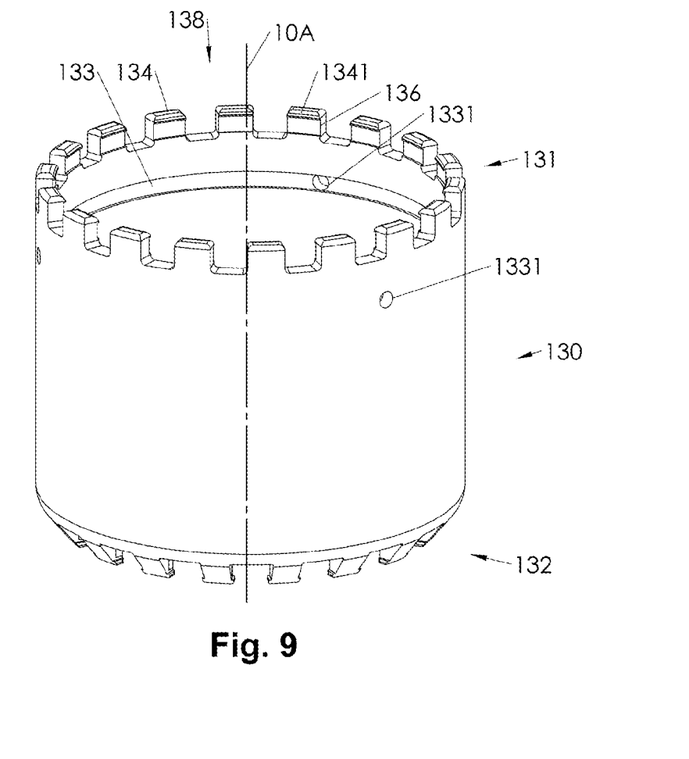
FIG. 9 is a sixth perspective view of a reaction socket of FIG. 6.

As further shown in FIGS. 7, 8, 9, the reaction socket interface 126 may be provided by a number of first castles 121 that are circumferentially arrayed at an end of the reaction coupling 120 and preferably radially dimensioned with a first outer castle array diameter 1210D that matches substantially an outer reaction socket body diameter 130OD. At the same time, the coupling interface 131 may be provided by a number of second castles 134 that are circumferentially arrayed at an end of the reaction socket 130 in mating opposition to the first castles 121. Likewise, the second castles 134 may be preferably radially dimensioned with an inner castle array diameter 134ID that matches substantially an inner reaction socket body diameter 130ID and an outer castle array diameter that matches substantially an outer reaction socket body diameter 130OD. Thereby, the coupling interface 131 is axially slide able and circumferentially interlocking with the reaction socket interface 126.

Employment of first and second castles 121, 134 and radial dimensioning 1210D, 134ID, 1340D of them in conjunction with the reaction socket body diameters 130ID, 130OD as well as the circumferentially opposite mating of first and second castles 121, 134 provides for a high structural strength and high transferable reaction torque from the reaction coupling 120 onto the reaction socket 130 while maintaining outer diameters 130OD, 1340D and inner diameters 130ID, 134ID substantially continuous all the way to the end of the reaction socket 130 including the coupling interface 131. This is advantageous on one hand for assembling the reaction socket 130 over the actuation socket 110 and on the other hand for keeping a maximum outer diameter of reaction coupling 120, reaction socket interface 126 and coupling interface 131 within the limits of reaction body diameters 130ID, 130OD. The reaction body diameters 130ID, 130OD may in turn be predetermined by structural needs for transferring a predetermined reaction torque within the reaction socket 130 body as may be clear to anyone skilled in the art.

First and second castles 121, 134 may have first and second internal recesses 122, 136 in the preferred configuration of first and second internal grooves 122, 136. At the same time, the reaction socket interface 126 may have a radial lock feature 123 in the preferred configuration of a lock plate 123. The preferably two lock plates 123 may be axially retained and radially slide able within the reaction socket 120 and in between a removable snap lock cover 127 and the reaction coupling body 1201. The lock plates 123 may be spring loaded forced via lock plate load springs 1232 into the first and second internal grooves 122, 136 while the reaction socket interface 126 is coupled with the coupling interface 131. Preferably, first and second internal grooves 122, 134 are axially with respect to the torque transfer axis 10A substantially aligned with each other while the reaction socket interface 126 is coupled with the coupling interface 131 such that the lock plates 123 may be of continuous thickness in between first and second castles 121, 134. The lock plates 123 thickness may preferably correspond to the axial height of the first and second internal grooves 122, 134.

The lock plates 123 may have each an externally accessible actuator 124 that may be circumferentially aligned with a respective one reduced height castle 1212. The actuator 124 is extending radially outward beyond the outer first and second outer castle array diameters 1210D, 1340D. Thereby, the reaction socket interface 126 may be coupled with the coupling interface 131 in any circumferential oppositely mating orientation to each other unimpeded by the actuators 124.

The preferably two lock plates 123 are positioned rotationally symmetric with respect to the torque transfer axis 10A such that the snap interlock between the reaction socket interface 126 and the coupling interface 131 is circumferentially evenly distributed between them. The lock plates 123 may be radially guided by lock plate guide pins 1231 as my be clear to anyone skilled in the art. The snap lock cover 127 may be held onto the reaction coupling body 1201 via cover screws 1272. The snap lock cover 127 may also provide the axial stop face 1271. The first inner castle array diameter 121ID may be substantially reduced below the second inner castle array diameter 134ID to provide sufficient radial depth of the first internal grooves 122 such that the lock plates 123 remain axially guided within them over their entire radial movement range.

The internal spline 125 may be provided by a spline ring 1251 axially attached at the end of the reaction coupling 120 that is opposite the reaction socket interface 126. That way, the reaction coupling 120 may be conveniently adapted to different spline flanges 11.

All parts of the concentric actuation and reaction torque transfer system 100 may be fabricated from steel or any other material suitable for transferring predetermined high torque loads. To apply an actuation torque to a predetermined actuation torque receiving structure 34 and to concurrently drain the corresponding reaction torque onto an axially adjacent reaction torque receiving structure in the preferred form of the reaction washer 10, an actuation socket 110 and reaction socket 130 with correspondingly shaped actuation and drain interfaces 113, 132 are selected. A reaction coupling 120 may be initially coupled with the spline flange 91 followed by coupling the actuation socket 110 with the drive shaft 95.

In case of actuation and reaction torque receiving structures 1, 10 having standardized shapes, a snap ring 115 may be employed and actuation and reaction socket 110, 130 may be selected as a preassembled set. In that case, actuation and reaction sockets 110, 130 may be together already while the actuation socket 110 is attached to the drive shaft 95. Alternately and in case of non standardized combination of shapes or sizes of actuation and reaction torque receiving structures 1, 10, the reaction socket 130 may be interchangeably selected to match the reaction washer 10 and may be consecutively slid over the actuation socket 110 following the preselection, coupling and attachment of the actuation socket 110 onto the drive shaft 95. The reaction socket 130 may be rotationally oriented such that its second castles 134 face the gaps in between the first castles 121. The reaction coupling 120 may be then axially slid along the spline flange 91 such that the reaction socket interface 126 engages with coupling interface 131. During coupling, lock plate displacement chamfers 1341 along the inner top edges of the second castles 134 may force the lock plates 123 radially inward until they give way for the second castles 134 to bottom out in between the first castles 121. At that moment, the second internal grooves 136 become aligned with the first internal grooves 122 and the lock plates 123 spring back and lock into both first and second internal grooves 122, 136. Thereby, a direct axial lock is established between first and second castles 121, 136 across the lock plates 123.

In case of an axial stop face 1271 being employed instead of a snap ring 115, The axial stop face 1271 resting against the lock pin 114 or the circumferential retention face 116 may keep the reaction coupling 120 and attached reaction socket 130 axially on to the torque wrench 90. The torque transfer system 100 is now ready to be put in position together with the attached torque wrench 90 over the predetermined actuation and reaction torque receiving structures 1, 10.

To disassembly the reaction socket 130 again, the actuators 124 are externally accessed and manually depressed, whereby the lock plates 123 are moved radially inward and the second castles 136 axially released. While the actuators 124 are kept depressed, the reaction socket 130 may be separated from the reaction coupling 120 and in the following the actuation socket 110 may be removed from the torque wrench 90 without having to loosen any screws. In case the reaction coupling 120 is axially loose connected to the torque wrench housing 92, it may be removed as well. In case the reaction coupling 120 is also axially connected to the torque wrench housing 92 via well known means, it may serve to easily and fast connect interchangeably various sizes of actuation sockets 110 and/or reaction sockets 120 with the torque wrench 90 as should be clear from the above.

Irrespective the preferred employment of the ring snap coupling 140 including the reaction socket interface 126, the coupling interface 131 and the radial lock feature 123 in conjunction with the concentric actuation and reaction torque transfer system 900, the ring snap coupling 140 may be independently employed to provide coupling of any two structures 120, 130 as described for the reaction socket 120 and reaction socket 130. The reaction socket interface 126 may thereby be any first coupling interface 126 at a first coupling end 128 of a first structure 120 and the coupling interface 131 may thereby be any second coupling interface 126 at a second coupling end 138 of a second structure 130.

Accordingly, the scope of the present invention is set forth by the following claims and their legal equivalent:

What is claimed is:
1. An interchangeable actuation and reaction torque transfer system comprising:
a. a torque transfer axis;
b. an actuation socket comprising:
i. a drive shaft torque interface on a first axial actuation socket end for coupling with a torque drive shaft;
ii. an actuation interface on a second axial actuation socket end that is opposite said first axial actuation socket end for coupling with an actuation receiving structure;
c. a reaction coupling comprising:
i. a torque wrench interface on a first axial coupling end for coupling with a torque wrench housing;
ii. a reaction socket interface on a second axial coupling end that is opposite said first axial coupling end;
d. a reaction socket comprising:
i. a coupling interface on a first axial reaction socket end for coupling with said reaction coupling;
ii. a drain interface on a second axial reaction socket end that is opposite said first axial reaction socket end;
e. a reaction washer comprising:
i. a reaction washer axis;
ii. a reaction torque receiving flange comprising a number of torque receive structures that are radially outward protruding and circumferentially arrayed around said washer axis along an outer circumference of said reaction washer for coupling with said drain interface; and
  iii. a conical bottom face comprising a number of bottom serrations that are circumferentially arrayed around said washer axis and that are radially inward extending from a circumference of said bottom conical face;
such that only outward ends of said bottom serrations initially penetrate into a base surface followed by said bottom serrations gradually penetrating radially inward into said base surface towards said washer axis while:
  a. said reaction washer is placed in between said actuation receiving structure and said base surface with said reaction washer axis being substantially coincident with said torque transfer axis;
  b. said actuation socket is coupled with said torque wrench shaft and said actuation receiving structure;
  c. said reaction coupling is coupled with said torque wrench housing and said reaction socket;
  d. said reaction washer is coupled with said reaction coupling;
  e. an actuation torque is applied to said torque wrench drive shaft around said torque transfer axis;
  f. an oppositely acting reaction torque is applied to said torque wrench housing around said torque transfer axis; and
  g. said reaction washer is increasingly flattening out.

2. The interchangeable actuation and reaction torque transfer system of claim 1, wherein:
  a. said reaction socket interface comprises a number of first castles that are circumferentially arrayed at a second axial coupling end; and
  b. said coupling interface comprises a number of second castles that are circumferentially arrayed at said first axial reaction socket end in mating opposition to said first castles such that said coupling interface is axially slide able and circumferentially interlocking with said reaction socket interface while said reaction socket interface and said coupling interface are axially coupled.

3. The interchangeable actuation and reaction torque transfer system of claim 2, wherein at least one castle of said first circumferential castle array comprises a first internal recess and at least one other castle of said second circumferential castle array comprises a second internal recess, and wherein said reaction socket interface further comprises a radial lock feature that is axially retained and radially slide able held within said reaction coupling and that is spring loaded forced into said first internal recess and said second internal recess while said reaction socket interface is coupled with said coupling interface.

4. The interchangeable actuation and reaction torque transfer system of claim 3, wherein said first internal recess is comprised of a first internal groove and said second internal recess is comprised of a second internal groove that is axially substantially aligned with said first internal circumferential groove while said reaction socket interface is coupled with said coupling interface, and wherein said radial lock feature is comprised of a lock plate.

5. The interchangeable actuation and reaction torque transfer system of claim 4, wherein said lock plate comprises an externally accessible actuator that is extending radially outward beyond an outer first castle diameter and that is circumferentially aligned with a height reduced one of said first castle such that said reaction socket interface may be coupled with said coupling interface in any circumferential oppositely mating orientation to each other unimpeded by the externally accessible actuators.

6. The interchangeable actuation and reaction torque transfer system of claim 1, wherein said torque receive structure comprises a torque receive face that is substantially radially inward oriented and aligned with said washer axis such that a torque around said washer axis received by said torque receive face results in a contact force that is substantially free of any radial outward force component on said drain interface.

7. The interchangeable actuation and reaction torque transfer system of claim 1, wherein said reaction torque receiving interface comprises a flange bottom that is recessed from in initial peripheral serration contact ring of said conical bottom face such that a clearance undercut is provided underneath said reaction torque receiving interface.

8. The interchangeable actuation and reaction torque transfer system of claim 1, wherein said reaction washer further comprises a cross section thickness that is substantially continuous in radial direction at least in between a top face and said serrated bottom face.

9. The interchangeable actuation and reaction torque transfer system of claim 1, wherein:
  a. said reaction washer further comprises a torque receiving flange and an initial peripheral serration contact ring; and
  b. said torque receiving flange is offset from said initial peripheral serration contact ring by a clearance height and is radially outward extending by a clearance radius from said initial peripheral serration contact ring.

10. The interchangeable actuation and reaction torque transfer system of claim 1, wherein:
  a. said reaction washer further comprises a torque receiving structure and an initial peripheral serration contact ring; and
  b. said torque receiving structure is offset from said initial peripheral serration contact ring by a clearance height; and
  c. said drain interface further comprises a torque transfer flank;
  d. said torque transfer flank comprises a hooking nose extending from a distal end of said torque transfer flank such that while said torque transfer flank is in contact with said torque receiving structure, said hooking nose is hooking in underneath said torque receive structure within said clearance height.

* * * * *